United States Patent Office 2,696,470
Patented Dec. 7, 1954

2,696,470

LUBRICATING GREASES THICKENED WITH CARBON BLACK

John J. Kolfenbach, Somerville, and Hans G. Vesterdal, Elizabeth, N. J., assignors to Standard Oil Development Company, a corporation of Delaware No Drawing. Application March 1, 1951,
Serial No. 213,464

3 Claims. (Cl. 252—22)

The present invention relates to lubricating greases thickened with carbon black. It relates more particularly to lubricating greases containing carbon black of such particle size and of such dispersion as to form a stable colloid or pseudo colloid of excellent lubricating characteristics. The invention pertains more especially to certain improvements in stability and non-staining characteristics of such greases.

In the prior art, various suggestions have been made for the use of carbon black in lubricants. In U. S. Patent 2,453,153 to Morway and Zimmer, there is described a lubricating composition consisting essentially of a suitable lubricating oil thickened to a grease consistency with about 3 to 20% of a carbon black. The particular type of carbon black employed can be varied within certain limits, but it is preferably a carbon black having reticulated particles as distinguished from fine discrete particles which are typical of the usual channel blacks. As pointed out in said patent, the acetylene blacks are particularly suitable for the purpose of thickening lubricating oils to grease consistency, although certain other types of blacks having the essential thickening properties may also be used.

Lubricating greases of the character described in the aforesaid patent, and those related compounds described in Patents 2,467,145; 2,467,146; 2,467,147; 2,467,148; 2,487,260 and 2,487,261, have some excellent properties and have received wide acceptance as industrial lubricants. They are subject, however, to two general deficiencies which have restricted their utility.

In the first place, when subjected to heavy unit pressures the carbon black greases tend to separate oil from the carbon. Where these lubricants are fed through pressure lines such oil separation tends to deposit the carbon black on the walls of the feed lines thus tending eventually to clog the lubricating system. This plugging of the system may also occur in the vicinity of the feeder and distributor valves which are close clearance piston cylinder arrangements. This of course is objectionable. The deposition of the carbon has been generally associated with the presence of minute leaks in the system which permit the separated oil to escape from the system leaving the carbon black deposited. An object of the present invention is to improve the dispensing characteristics of carbon black greases in this respect.

Another deficiency of carbon black greases is their extreme tendency to stain the hands and clothes of workmen who come in contact with them. Some carbon black greases are very difficult to remove with soap and water. The acetylene black greases are much less objectionable in this respect than those containing the finer particle carbon blacks such as the common channel blacks. Nevertheless, even when acetylene blacks are used as grease thickeners, there is some objectionable staining of hands and clothing which has made workmen dislike the carbon black greases for many applications. A further object of the present invention is to reduce and substantially eliminate this objectionable staining property. The problem is more severe with the fine particle blacks but with the present invention even these can be very substantially improved as regards their staining properties.

According to the present invention it has been found that the carbon black, and especially but not only acetylene carbon black, may be coated in situ with a soap which is at or near its melting point, and hence in a liquid state, to provide a grease thickener. A grease so treated retains the excellent high temperature lubricating characteristics of carbon black greases but it is substantially free from the extreme staining tendency mentioned above. It also is much less susceptible to oil separation than the straight carbon black greases. These advantages may be obtained without loss of the exceptionally good high temperature and water resistant properties of the carbon black greases.

Specifically, it is preferred to coat the carbon black in the oil with a soap, especially a waterproof soap, e. g. a lithium soap of long chain fatty acids. Lithium soap, as is well known, is less affected by moisture than the other alkali metal soaps and in many applications high moisture resistance is an important and desirable characteristic. For example, in the lubrication of the roll neck bearings of rollers in steel mills, where large quantities of water are applied for cooling and where high operating temperatures are normally encountered, as well as high pressures, the carbon black greases, especially as modified according to the present invention are excellent lubricants.

The coating of the acetylene or other carbon black is conveniently accomplished by mixing the carbon black into a soap-oil mixture. Subsequently the mixture is heated to, or approximately to the melting point of the soap and thereafter it is allowed to cool, followed by stirring down the grease to the desired consistency, or penetration number. By this method the soap is essentially subdivided from the macro state to the molecular state. With such subdivision the soap provides a tremendously large surface area, apparently more than sufficient to coat the colloidal carbon black. The finer the state of subdivision, of course, the greater the total surface of soap presented.

The examples tabulated below illustrate the invention in greater detail.

Table I

|  | Examples | | | |
|---|---|---|---|---|
|  | I | II | III | IV |
| Percent Acetylene Black | 6.0 | 8.0 | 3.75 | 6.0 |
| Percent Channel Black (fine particle) |  |  | 2.25 |  |
| Percent Fatty Acids ("Hydrofol 54") | 4.0 | 2.0 | 4.00 | 2.0 |
| Percent LiOH—H₂O | 0.6 | 0.3 | 0.60 | 0.3 |
| Percent Mineral Lub. Oil—70 S. S. U. |  |  |  |  |
| Vis. @ 210° F | 89.4 | 89.7 | 89.40 | 89.7 |
| Dropping Point, °F | 500+ | 500+ | 375 | 500+ |
| Micropenetration, mm./10 | 91 | 81 |  |  |
| Est. Macropenetration, mm./10 | 260 | 235 |  |  |

The fatty acids employed were hydrogenated fish oil acids having an average of about 18 carbon atoms and corresponding roughly to stearic acid, these being solid under the trade name of "Hydrofol Acids 54." The fatty acids and about one-third of the mineral oil were first mixed together and heated to about 160° F. to melt the acids. The lithium hydroxide-H₂O in water solution was added and the soap was dehydrated by heating the mixture to 360° F. Thereafter the carbon black and the remainder of the mineral oil were added and the mixture was then heated to 420° F.

Different batches were made of various consistencies. The fluid materials were poured into pans and the non-fluid materials which remained or could not be poured were permitted to cool in the kettle. Both the liquid and the non-liquid materials cooled to form excellent greases of smooth texture upon stirring the cooled mixture. In all cases the grease products could readily be removed from the human skin with soap and water and without leaving a carbon black residue that was difficult to clean. This latter feature is in striking contrast to the conventional carbon black greases of the prior art described in detail in the patents mentioned above.

In order to obtain a product of high dropping point characteristics, typical of carbon black greases, the carbon black content should be at least 4.5% by weight of the total grease composition. Grease structures can be obtained, however, with lower carbon black content but they do not stand up well at high temperatures, e. g.

above 400° F. With acetylene black as the thickener, greases of reasonable consistency may be obtained with slightly lower than 4.5% carbon black but their dropping points are more characteristic of those of lithium soap greases than of carbon black greases. Lithium soap of $C_{12}$ to $C_{22}$ saturated acids, e. g. of hydrogenated fish oil acids (essentially lithium stearate) which coats the carbon black melts in the general range of 365 to 400° F. and greases containing less than 4.5% acetylene black have a similar melting point. The grease is made by heating to this temperature range. However, as the acetylene black content is higher than 4.5% as in Examples I, II, and IV, the high dropping points characteristic of acetylene black greases (500° F. or more) can be maintained. In Example III a fine particle black sold under the trade name of "Superba" was used along with the acetylene black. The total proportion of carbon black was 6% in this example but the fine particle black was not sufficient, in combination with the acetylene black, to maintain the high dropping point which is characteristic of the acetylene black thickened lubricants. It will be noted, however, that even with as much as 2.25% of the fine particle carbon black, which ordinarily is extremely staining to hands and clothing, the product was so thoroughly coated with soap that it was non-staining.

In all the examples given above, lithium soap was employed as the coating agent. It is apparent, however, that any soap which can be contacted with the carbon black in molecular or approximately molecular sub-division can be used with similar results. Thus the soaps, especially the $C_{12}$ to $C_{22}$ saturated fatty acid soaps of calcium, barium, aluminum, strontium, sodium and potassium and perhaps of other metals appear satisfactory. These must be melted or substantially liquefied to be effective.

As indicated above water resistance is frequently an important property in greases of the carbon black type. It is requisite for steel mill operation where the carbon black type greases have outstanding utility. For this reason it is preferred to use water resistant soaps such as the higher fatty acid soaps of lithium especially, calcium, barium, strontium and aluminum soaps also being useful.

The extreme pressure greases which are of particular interest for heavy duty applications such as steel mill lubrication are similar except that they also require an extreme pressure agent. Sulfurized or phospho-sulfurized fatty oils, chlorinated fats or hydrocarbons, or a combination of materials may be used, with or without lead soaps. The invention described above is particularly applicable to these extreme pressure lubricating greases. The extreme pressure additives tend to augment the tendency to separate oil from the carbon black thickener under heavy pressure. Such separation is apt to result not only in inadequate lubrication, but also in carbon deposition, clogging of lubricant passages and the like.

In some large industrial mills where centralized lubricating systems have been installed the lubricant is fed from a central supply point through feed lines to the various points of use. The feed pressures applied to the lubricant are sometimes sufficient to enhance the tendency toward oil separation, characteristic of carbon black greases, to the point where carbon will be deposited on the supply tubes and these tubes may even be blocked in extreme cases. By coating the carbon black with soap, as described above, the tendency toward oil separation is greatly diminished and trouble with the deposition of carbon black on the walls of feed tubes, valves, etc., may be entirely overcome. The pressure applied to such greases, to pump them to the point of use, of course, should not be confused with the extreme pressures between moving parts.

Apparently the carbon blacks, particularly reticulate particle blacks such as acetylene black, form a structure which holds the lubricating oil largely by entrainment. When high pressures are applied to such systems the oil can be forced out of entrainment. On the contrary, the soap greases do not suffer from this deficiency. Apparently the soap holds the oil in the grease not only by entrainment in a physical soap structure, but also by physical attraction, perhaps by van der Waal's forces.

Hence when the carbon black is coated with soap a surface or structure is obtained which establishes the physical forces necessary to hold the oil under pressure. At the same time the high temperature dropping point, the water resistance, and the other desirable characteristics of the carbon black are maintained.

In order to illustrate further the effect of using a mixture of acetylene black and soap in grease, three batches of grease were prepared containing the same amount (10%) of thickening agents (carbon and soap), (V) a pure soap grease, (VI) a pure acetylene black grease and (VII) a grease containing 4% soap and 6% acetylene black. All three samples were heated to 420–440° F., and the acetylene black was added at this temperature. Mixing was continued until the temperature dropped to 380° F. at which point the greases were panned. As shown in the table below the grease (#VII) which contained both acetylene black and lithium stearate had the same high dropping point (500° F. +) as the pure acetylene black grease, and only about one-third as much oil separated from this grease as from the acetylene black grease in a 94 hour oil separation test at room temperature under 6 p. s. i. g. pressure.

| Grease Number | V | VI | VII |
|---|---|---|---|
| Lithium Stearate, wt. percent | 10 | 0 | 4. |
| Acetylene Black, wt. percent | 0 | 10 | 6. |
| Mineral Oil—80 S. S. U. Viscosity @ 210° F., wt. percent | 90 | 90 | 90. |
| ASTM Worked Penetration, mm./10 | 238 | 306 | 302. |
| Dropping Point, °F | 380 | 500+ | 500+. |
| Oil Separation, wt. percent | 0.4 | 5.6 | 1.6. |
| Ease of Washing From Hands | Excellent | Poor | Excellent. |

The grease samples containing soap (#V and VII) could be washed easily from the hands with laundry soap and water, while the pure acetylene black grease (#VI) was very hard to remove. The preferred procedure involves first forming the soap in situ in the oil to make, in effect, a thin grease and adding the carbon black. The carbon black is then coated with liquid soap, the mixture is worked mechanically and cooled with further stirring. Finally the extreme pressure agent is added and the mixture is stirred down while it cools until the desired penetration range or consistency is obtained. Additional examples of extreme pressure greases are shown below in Table II.

*Table II.—High melting E. P. grease*

| | VIII | IX | X | XI |
|---|---|---|---|---|
| Acetylene Black | 8.00 | 6.00 | 6.00 | 4.50 |
| Fatty Acids ("Hydrofol 54") | 2.00 | 4.00 | 2.00 | 3.00 |
| LiOH $H_2O$ | 0.30 | 0.60 | 0.30 | 0.45 |
| Mineral Oil of 70 S. S. U. Vis. @ 210° F | 80.45 | 80.15 | 82.45 | 67.05 |
| Pb Naphthenate | 1.25 | 1.25 | 1.25 | 20.00 |
| Sulfurized Sperm Oil | 6.00 | 6.00 | 6.00 | 5.00 |
| Conventional Chlorine-Containing Additive | 2.00 | 2.00 | 2.00 | |
| Plasticity for Panning | (1) | (1) | (2) | (2) |
| Dropping Point, °F | 500+ | 478 | 500+ | 280 |
| Micropenetration, mm./10 | 81 | 126 | 208 | 91 |
| Macro pen. mm./10, Est | 235 | 300 | 355 | 260 |

[1] Too hard.
[2] Excellent.

It will be noted in the above table the extreme pressure greases contained lead naphthenate, sulfurized sperm oil, and, in most cases a commercial chlorinated extreme pressure additive. The latter is essentially a chlorinated paraffin. It will be noted also that Examples VIII and IX were too hard for panning, the first of these containing 8% acetylene black. Examples X and XI, however, had excellent plasticity but the last mentioned had a low dropping point due to its low acetylene black content (4.5%). These products are useful where the high dropping point is not essential but not for high temperature service. Ordinarily it is preferred to use enough carbon black to obtain its full high temperature advantages. As indicated above, the acetylene black content ordinarily should be at least 4.5% and is preferably 6% or more in the case of the extreme pressure lubricants.

To further determine the minimum carbon black requirements, another composition was prepared as Example XII, as follows:

Acetylene black _____ percent by weight __ 4.50
Hydrogenated fish oil acids _____ percent __ 2.00
Lithium hydroxide monohydrate _____ do ____ 0.30
Lead naphthenate _____ } (Extreme pressure components) { 1.25
Sulfurized sperm oil (12% sulfur) _____ } { 6.00
Chlorinated paraffin compound _____ percent __ 2
Mineral oil, 70 S. S. U. vis. @ 210° F _____ do ____ 83.95

The dropping point of the grease before adding the extreme pressure agents was 500° F. +. This grease without the E. P. agents had the following composition:

| | Per cent |
|---|---|
| Acetylene black | 5 |
| Lithium soap of hydrofol acids | 2.20 |
| Mineral oil | 92.8 |

After adding the E. P. agents the dropping point was 405° F. thus indicating that somewhat more than 4½% of acetylene black is necessary in the E. P. formulations in order to obtain a dropping point of 500° F. The minimum will vary with the type and quantity of extreme pressure additive (which normally tends to lower the dropping point) but is apparently from 5 to 6% by weight.

The invention is not applicable alone to carbon black greases. Greases containing other non-soap or inorganic thickeners such as silica gel and other voluminous precipitate type thickeners can also be modified by coating with soap to improve their resistance to oil separation.

It will be understood that the greases of the present invention may be modified further by adding to them various conventional agents such as viscosity index improvers, anti-oxidants, stringiness or tackiness agents, corrosion inhibitors, metal deactivators, and the like.

It will also be understood that although mineral base lubricating oils are preferred as the principal lubricating medium, other oils of various synthetic types may be used wholly or in part. Thus, the polybasic acid esters which have excellent low temperature properties, the polyglycols and glycol ethers of lubricating grade, etc., may be used to replace all or part of the mineral oil.

In general the carbon black content will range from 4.5 to about 15%, preferably ranging from about 6 to 10% where high temperature properties are desirable. The lithium soap content, where this particular soap is used is preferably between 2 and 5% although a wider range from 1 to 6 or 7% of soap may be used. The same range is applicable to the other soaps listed above. It should be emphasized that where the high temperature properties, and the other outstanding properties of carbon black greases are required, the soap content should be held to a minimum consistent with adequate coating of the carbon black particles.

What is claimed is:

1. The process of preparing a lubricating grease which comprises forming a thin soap grease by cooking 1% to less than 5% by weight, based on finished grease, of a metal soap of $C_{12}$ to $C_{22}$ substantially saturated fatty acids with a metal selected from the group consisting of the alkali, alkaline earth metals and aluminum in a grease-forming lubricating oil at a soap-forming temperature, adding 4.5–15% by weight, but more than said soap, of reticulate particle carbon black of high oil absorptive properties, heating the mixture so formed to a temperature sufficiently high to maintain the soap in the liquid state, mechanically working the mixture to obtain a high degree of soap coating on the carbon black, and cooling to obtain a stable grease structure.

2. Process according to claim 1 wherein the soap is lithium soap, the carbon black is preponderantly acetylene black and said mixture is heated to a temperature of about 365° to 440° F.

3. Process according to claim 1 wherein the cooled grease is stirred down to the desired consistency.

References Cited in the file of this patent

UNITED STATES PATENTS

| Number | Name | Date |
|---|---|---|
| 2,274,673 | Earle | Mar. 3, 1942 |
| 2,453,153 | Morway et al. | Nov. 9, 1948 |
| 2,487,260 | Morway | Nov. 8, 1949 |
| 2,522,460 | Morway et al. | Sept. 12, 1950 |